United States Patent

Raetzsch et al.

[11] Patent Number: 5,929,127
[45] Date of Patent: Jul. 27, 1999

[54] FINE-CELLED POLYOLEFIN FOAM MATERIALS

[75] Inventors: Manfred Raetzsch, Kirchschlag; Hartmut Bucka, Eggendorf; Ulf Panzer, Perg; Achim Hesse, Linz; Norbert Reichelt, Neuhofen; Dirk Leistner, Vienna, all of Austria

[73] Assignee: Borealis AG, Schwechat-Mannsworth, Austria

[21] Appl. No.: 09/085,064

[22] Filed: May 27, 1998

[30] Foreign Application Priority Data

Jun. 10, 1997 [DE] Germany .......................... 197 24 312

[51] Int. Cl.$^6$ ...................................................... C08J 9/00
[52] U.S. Cl. ................................. 521/81; 521/79; 521/98; 521/142; 521/143; 521/134
[58] Field of Search ................... 521/98, 79, 81, 521/142, 143, 134

[56] References Cited

U.S. PATENT DOCUMENTS

| | | | |
|---|---|---|---|
| 4,160,072 | 7/1979 | Shinkai et al. | 521/86 |
| 4,212,787 | 7/1980 | Matsuda et al. | 525/240 |
| 4,702,868 | 10/1987 | Pontiff et al. | 521/91 |
| 4,870,111 | 9/1989 | Pontiff et al. | 521/60 |
| 5,605,937 | 2/1997 | Knaus | 521/60 |
| 5,643,969 | 7/1997 | Sugamo et al. | 521/134 |

*Primary Examiner*—Morton Foelak
*Attorney, Agent, or Firm*—Jordan and Hamburg

[57] ABSTRACT

Fine-celled polyolefin foams of high dimensional stability at elevated temperatures and high stiffness, with foam densities ranging from 10 to 600 kg/m$^3$, consisting of mixtures of polypropylenes and polyolefins, which were reacted with bifunctional, unsaturated monomers and/or hydrolyzable, ethylenically unsaturated organosilane compounds in the presence of thermally decomposing free radical-forming agents in two reactive process steps and subsequently foamed. The fine-celled polyolefin foams are suitable for use in the packaging sector, preferably for packaging foods, for external and internal parts of motor vehicles and for components of electric and electronic equipment.

11 Claims, No Drawings

FINE-CELLED POLYOLEFIN FOAM MATERIALS

BACKGROUND OF THE INVENTION

The invention relates to fine-celled polyolefin foams, which are suitable for use in the packaging sector, for motor vehicle parts and for components of electric and electronic equipment.

The production of polyethylene foams, which are not cross linked, from high-pressure polyethylene as polyethylene extrusion foams (WO 87 04445) or polyethylene particle foams by the extrusion method (EP 0 505 850) or by the suspension impregnation method (EP 0 212 204) is known. The long-chain branchings, contained in the high pressure polyethylene, bring about a high melt strength of the polyethylene and, as a result, a melt of high stability in the foaming step.

The low dimensional stability at elevated temperature and the low stiffness are disadvantages of polyethylene foams. Compared to polyethylene foams, polypropylene foams have a higher dimensional stability at elevated temperatures and a higher stiffness. However, because of the low melt strength of the linear polypropylene, the processing of polypropylenes into polypropylene foams requires expensive technological measures or a modification of the polypropylene. It is not possible to process standard propylenes on conventional foam extruders.

For the production of extrusion foams using standard polypropylenes, carbon dioxide as a blowing agent and nucleating agents, the foamed sheet must be pulled off by special take-off rollers heated to 95° C. (Dey, S., SPE-ANTEC 1996, 1955–1958).

To achieve a uniform cell structure in particle foams using the suspension impregnation method and unmodified polypropylenes, expensive technological measures are required, such as treating the reactor contents with a gas at the bottom of the reactor during the discharging process (below the stirrer or through the stirrer) (EP 0 630 935) or adding a heating fluid during the emptying of the autoclave until ¾ of the particle foam has been discharged (EP 0 290 943). High shrinkage is a further problem of particle foams, which were prepared from unmodified polypropylenes using butane as a blowing agent. By an expensive treatment of the shrunken particles at a temperature 20° below the softening temperature, under compressed air or a compressed inert gas, the shrinkage can be reversed (EP 0 687 709).

It is furthermore known that polypropylene blends and modified polypropylenes can be processed on normal, standard polyethylene foam extruders into extrusion foams and extrusion particle foams.

Known blending components for polypropylene during the manufacture of extrusion foams on normal, standard polyethylene foam extruders are polyethylene (British patent 2,099,434), EVA (British patent 2,099,434), butyl rubber (European patent 0 570 221), styrene-butadiene rubber (U.S. Pat. No. 4,467,052), as well as (meth)acrylate copolymers (U.S. Pat. No. 5,506,307). However, these blending components, which are not coupled, lead to a strong decrease in the dimensional stability at elevated temperatures, as well as in the stiffness and the compression strength of the polypropylene foams.

Known modified polypropylenes, which are suitable for the production of extrusion foams and extrusion particle foams, are polypropylene, modified by peroxides capable of polymerizing (WO 94 05 707) and polypropylenes, modified by high energy electron beam radiation (EP 0 190 889, De Nicola, A., Polymeric Materials Science and Engineering (1995), 106–108).

The very high costs of the safety measures for the biological shielding of the high-energy radiation are a disadvantage of the method of modifying polypropylene by high-energy electron radiation. These safety measures make it necessary to shield the irradiation chamber hermetically by means of thick special concrete walls or lead segment constructions, to employ an expensive measuring technique as protection against radiation and to medically monitor the operating personnel.

It is an object of the present invention to develop fine-celled polyolefin foams of high dimensional stability at elevated temperatures and stiffness with foam densities ranging from 10 to 600 kg/m$^3$, while avoiding the disadvantages of the known foam formulations.

SUMMARY OF THE INVENTION

Pursuant to the invention, this objective was accomplished by polyolefin foams using mixtures of 10 to 90% by weight and preferably 60 to 80% by weight of polypropylenes and 90 to 10% by weight and preferably of 40 to 20% by weight of polyethylenes, which are processed in two reactive process steps and one foaming step.

DETAILED DESCRIPTION OF THE INVENTION

In the first reactive process step, a preliminary reaction takes place, in which the mixtures of polypropylene and polyethylene are partially reacted either in the solid phase or in the transition phase between the solid phase and the melt with 0.05 to 2% by weight of bifunctional, ethylenically unsaturated monomers and/or with 0.1 to 5% by weight, in each case based on the polyolefins used, of hydrolyzable, ethylenically unsaturated organosilane compounds in the presence of a thermally decomposing free radical-forming agent.

For carrying out the first reactive step of the reactive process in the solid phase, powdery polypropylene/polyethylene mixtures are partially reacted with the ethylenically unsaturated monomers at reaction temperatures of 55° to 105° C. in continuous screw mixers in the presence of 0.01 to 0.85% by weight, based on the polyolefin used, of thermally decomposing free radical-forming agents based on acyl peroxides, alkyl peroxides, hydroperoxide and/or peresters, which have a half-life of 0.2 to 5 minutes at the reaction temperature.

For carrying out the first step of the reactive process in the solid phase/melt transition phase variation of the process, the partial reaction of polypropylene-polyethylene mixtures with the ethylenically unsaturated monomers takes place at reaction temperatures of 105° to 190° C. in twin screw extruders in the presence of 0.01 to 0.85% by weight, based on the polyolefins used, of thermally decomposing free radical-forming agents based on acyl peroxides, alkyl peroxides, hydroperoxides, peroxy carbonates, peresters and ketone peroxides, peroxyketals and/or azo compounds, which have a half-life of 0.2 to 2 minutes at the reaction temperature.

At the end of the first reactive process step, 5 to 35% by weight of the ethylenically unsaturated monomers used and 10 to 40% by weight of the thermally decomposing free radical-forming agents are contained unchanged in the reaction mixture.

In the second reactive process step, coupling of the unreacted reactants, contained in the reaction mixture, takes place in a twin screw extruder by adjusting the temperature of the reaction mixture to a value in the range of 195° to 270° C. and adding 0.3 to 8% by weight of blowing agents and optionally 0.01 to 0.35% by weight of peroxides in each case based on the polyolefins used.

The reaction mixture is discharged from the extruder in a known manner with foaming and is removed as a foamed semi-finished product in the form of sheets, pipes or profiles or discharged as a foamed extrudate and cut up into particle foam segments immediately.

Before or during the first and/or second reactive process step, 0.01 to 1% by weight of nucleating agents, 0.01 to 2.5% by weight of stabilizers, 0.1 to 1% by weight of antistatic agents, 0.2 to 3% by weight of pigments, 5 to 40% by weight of fillers and/or reinforcing materials, 2 to 20% by weight of flame retardants, 0.1 to 5% by weight of silanol condensation catalysts and/or 0.1 to 1% by weight of processing aids each based on the mixture of polypropylenes and polyethylenes used, may optionally be added.

Preferably, suitable polypropylenes for the production of fine-celled polyolefin foams of high dimensional stability at elevated temperatures and high stiffness are polypropylene homopolymers and/or copolymers of propylene and α-olefins with 2 to 18 carbon atoms as well as mixtures of said polypropylenes, which are used as powders, granulates or grits with a preferred particle size ranging from 0.001 to 7 mm and preferably from 0.05 to 4 mm.

As polyethylenes for the production of fine-celled polyolefin foams of high dimensional stability at elevated temperatures and high stiffness, particularly HDPE, LDPE, LLDPE and ULDPE types, as well as copolymers of ethylene and α-olefins with 3 to 18 carbon atoms or copolymers of ethylene, unsaturated esters and/or unsaturated carboxylic acids as well as mixtures of these polyethylenes are suitable pursuant to the invention. The polyethylenes are preferably used as powders, granulates or grits with a particle size ranging from 0.001 to 7 mm and preferably from 0.05 to 4 mm.

It proves to be particularly advantageous to use polypropylenes and polyethylenes directly from the polymerization plant.

Suitable, bifunctional, ethylenically unsaturated monomers, which are used pursuant to the invention for the production of fine-celled polyolefin foams are:

diacrylates or dimethacrylates, such as ethylene glycol diacrylate or diglycol dimethacrylate, polyacrylates or polymethacrylates, such as glycerin triacrylate or pentaerythritol tetramethacrylate, diallyl compounds, such as diallyl cyanurate, diallyl phthalate or diallyl maleate, triallyl compounds, such as triallyl citrate, triallyl cyanurate or triallyl isocyanurate macromers based on oligobutadienes, polysiloxanes and/or polyethers, with acryl, allyl, isocyanate, oxazolin or vinyl end groups.

Preferred, suitable, bifunctional, ethylenically unsaturated monomers are:

$C_4$ to $C_{10}$ dienes such as butadiene, butadiene-1-carboxylic acid, chloroprene, 1,3-cyclohexadiene, 1,5-cyclohexadiene, cyclopentadiene, 2,3-dimethylbutadiene, 1-ethoxybutadiene, 1,4-heptadiene, 1,4-hexadiene, 1,6-hexadiene, isoprene, norbornadiene and/or 1,4-pentadiene, $C_5$ to $C_9$ allyl compounds such as allyl acrylate, allyl methacrylate, allyl methyl maleate and/or allyl vinyl ether, $C_7$ to $C_{10}$ divinyl compounds such as divinylaniline, m-divinylbenzene, p-divinylbenzene, diethylene glycol divinyl ether, divinylpentane and/or divinylpropane.

Especially preferred bifunctional ethylenically unsaturated monomers are butadiene, isoprene, dimethylbutadiene, allyl acrylate and/or divinylbenzene.

Advantageously, mixtures of these bifunctional, ethylenically unsaturated monomers are used.

Suitable, hydrolyzable, ethylenically unsaturated silane compounds, which are used in the first reactive process step for the production of fine-celled polyolefin foams of high dimensional stability at elevated temperatures and high stiffness, are:

alkenylalkoxysilanes such as allyltriethoxysilane or allyltrimethoxysilane, alkenylhalogensilanes, such as allylmethyldichlorosilane or allyltrichlorosilane, aminoalkenylsilanes, such as aminobutenyltriethoxysilane, aminovinylsilanes, such as aminoethyldiethoxyvinylsilane, cycloalkenylsilanes, such as cyclohexenyltriethoxysilane or triethoxysilylbicycloheptene, styrylalkoxysilanes, such as styrylethyltrimethoxysilane or trimethoxysilylstyrene, vinylhalogensilanes, such as vinylethyldichlorosilane or vinylmethyl-dichlorosilane, vinylcarboxysilanes, such as vinylmethyldiacetoxysilane or vinyltriacetoxysilane.

Preferably, suitable, hydrolyzable, ethylenically unsaturated silane compounds are:

methacryloxyalkylsilanes, such as methacryloxypropyltrimethoxysilane, methacryloxypropyldimethylethoxysilane, methacryloxypropylmethyldiethoxysilane, methacryloxypropyltriethoxysilane, methacryloxypropyltrismethoxyethoxysilane, trimethylsiloxyethyl methacrylate and/or methacryloxypropyldimethyl-chlorosilane, vinylalkoxysilanes, such as vinyltributyoxysilane, vinyltriethoxysilane, vinyltriisopropoxysilane, vinyltrimethoxysilane, vinyltrismethoxyethoxysilane, vinyltristrimethoxysiloxysilane, vinyldimethylethoxysilane, vinyldimethylmethoxysilane, vinylethyldiethoxysilane, vinylmethyldiethoxysilane, phenylvinyltrimethoxysilane, diphenylvinylethoxysilane, vinylphenyldiethoxysilane, vinylphenyldimethoxysilane and/or vinylphenylmethylmethoxysilane.

Especially preferred are vinyltrimethoxysilane, vinyltriethoxysilane and/or methacrylisopropyltrimethoxysilane.

Advantageously, mixtures of these hydrolyzable, ethylenically unsaturated silane compounds are used.

Pursuant to the invention, the fine-celled polyolefin foams of high dimensional stability at elevated temperatures and high stiffness are produced with foam densities ranging from 10 to 600 kg/m³ from polypropylenes and polyethylenes by a method, for which mixtures of 10 to 90% by weight and preferably 60 to 80% by weight of polypropylenes and 90 to 10% by weight and preferably 40 to 20% by weight of polyethylenes are processed in two reactive process steps and one foaming step.

In the first reactive process step a), there is a preliminary reaction, in which either the powdery polypropylene-polyethylene mixture is partially reacted in the solid phase at reaction temperatures of 55° to 105° C. in continuous screw mixers with 0.05 to 2% by weight of bifunctional, unsaturated monomers and/or 0.01 to 5% by weight of hydrolyzable, ethylenically unsaturated organosilane compounds in the presence of 0.01 to 0.85% by weight of thermally decomposing free-radical forming agents based on acyl peroxides, alkyl peroxides, hydroperoxides and/or peresters, which have a half-life of 0.2 to 5 minutes at the reaction temperature, in each case based on the polyolefins used or the polypropylene-polyethylene mixture is partially reacted in a solid phase/melt transition phase at reaction temperatures of 105° to 190° C. in twin screw extruders with bifunctional unsaturated monomers and/or hydrolyzable ethylenically unsaturated organosilane compounds in the presence of 0.01 to 0.85% by weight, based on the polyolefins used, of thermally decomposing free-radical forming agents based on acyl peroxides, alkyl peroxides, hydroperoxides, peroxycarbonates, peresters, ketone peroxides, peroxyketals and/or azo compounds, which have a half-life of 0.2 to 2 minutes at the reaction temperature.

After process step a), 5 to 35% by weight of the ethylenically unsaturated monomers and 10 to 40% by weight of the thermally decomposing free radical-forming agents used are contained unchanged in the reaction mixture.

In the second reactive process step b), a coupling of the unreacted reactants, contained in the reaction mixture, takes place in a twin screw extruder by adjusting the temperature of the reaction mixture to a value ranging from 195° to 270° C. with addition of 0.3 to 8% by weight of blowing agents and optionally of 0.01 to 0.35 % by of peroxides weight, in each case based on the polyolefins used.

In the foaming step c), the reaction mixture is discharged with foaming from the extruder in a known manner and removed as a foamed semi-finished product in the form of sheets, pipes or profiles or discharged as foamed extrudate and cut into particle foam segments immediately.

Before or during the first and/or second reactive process step, 0.01 to 1% by weight of nucleating agent, 0.01 to 2.5% by weight of stabilizers, 0.1 to 1% by weight of antistatic agents, 0.2 to 3% by weight of pigments, 5 to 40% by weight of fillers and/or reinforcing materials, 2 to 20% by weight of flame retardants, 0.1 to 5% by weight of silanol condensation catalysts and/or 0.1 to 5% by weight of processing aids, each based on the mixture of polypropylenes and polyethylenes used, may optionally be added.

For the solid phase variation of the first reactive process step and use of readily volatile, ethylenically unsaturated bifunctional monomers, it is advantageous to apply the monomers by absorption from the gas phase on the polyolefin mixture.

For the inventive method, the following thermally decomposing free radical-forming agents are suitable in the first reactive process for the preliminary reaction in the solid phase:

acyl peroxides, such as acetyl benzoyl peroxide, benzoyl peroxide, 4-chlorobenzoyl peroxide, dinitrobenzoyl peroxide, 3-methoxybenzoyl peroxide and/or methyl benzoyl peroxide;

alkyl peroxides, such as allyl t-butyl peroxide, 2,2-bis-(t-butylperoxybutane), 1,1-bis-(t-butylperoxy)-3,3,5-trimethylcyclohexane, diisopropylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide and/or 1-hydroxybutyl n-butyl peroxide;

hydroperoxides, such as decalin hydroperoxide and/or tetralin hydroperoxide;

peresters and peroxy carbonates, such as butyl peracetate, cumyl peracetate, cumyl perpropionate, cyclohexyl peracetate, di-t-butyl peradipate, di-t-butyl perazelate, di-t-butyl perglutarate, di-t-butyl perphthalate, di-t-butyl persebacate, 4-nitrocumyl perpropionate, 1-phenylethyl perbenzoate, phenylethylnitroperbenzoate, t-butyl-bicyclo-(2,2,1) heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butyl perbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propyl-2-perpentanoate, t-butyl-1-methylcyclopropyl percarboxylate, t-butyl-4-nitrophenyl peracetate, t-butylnitrophenyl peroxycarbamate, t-butyl-N-succinimido percarboxylate, t-butyl percrotonate, t-butyl permaleate, t-butyl permethacrylate, t-butyl peroctoate, t-butyl peroxyisopropylcarbonate, t-butyl perisobutyrate, t-butyl peracrylate and/or t-butyl perpropionate.

Advantageously, mixtures of these free radical-forming agents are also used.

For making a selection on the basis of the specific reaction conditions, the half-lives of the free radical-forming agents at the corresponding reaction temperature can be taken directly from Tables or calculated from the decomposition constants of free radical-forming agents and the activation energy of the decomposition of the free radical-forming agent, listed in Tables, such as those given in the Polymer Handbook, 3rd Edition, J. Wiley & Sons, 1989, II/1.

Moreover, for the preliminary reaction in the solid phase/melt transition phase, the following are suitable as thermally decomposing free radical-forming agents in the first reactive process step:

ketone peroxides, such as methyl ethyl ketone hydroperoxide;

peroxyketals, such as 1,1-di-t-butylperoxy-3,3,5-trimethylcyclohexane;

azo compounds, such as 2-cyano-2-propylazoformamide, 2,2'-azo-bis-2-methyl-propionitrile, 1,1'-azo-bis-cyclopentanenitrile, 1,1'-azo-bis-cyclohexanenitrile, 2,2'-azo-bis-cyclohexylpropionitrile, 2,2'-azo-bis-methyl-2-methyl propionate, azo-bis-(N,N-diethyleneisobutyramidine), 1,1'-azo-bis-1-phenylethane and/or 1,1'-azo-bis-1-phenylpropane.

Preferred, suitable blowing agents, which are used for the production of the fine-celled polyolefin foams in the second reactive process step are:

gas-evolving blowing agents, such as sodium hydrogen carbonate, azodicarbonamide and/or cyanuric acid trihydrazide, readily volatile hydrocarbons, such as pentane, isopentane and/or isobutane, highly volatile hydocarbons, halogenated hydrocarbons, such as monofluorotrichloromethane and/or difluoromonochloromethane, highly volatile halogenated hydrocarbons and gases, such as nitrogen, argon and/or carbon dioxide.

The thermally decomposing free radical-forming agents, optionally additionally used for the inventive method in the second reactive process step, correspond to the free radical-forming agents, which are used in the first reactive process step for the solid phase/melt transition phase variation of the process.

Examples of nucleating agents, which optionally may be added to the reaction mixture for the inventive method of producing fine-celled polyolefin foams before or during the first and/or second reactive process step, are α-nucleating agents, such as talcum or sodium benzoate or β-nucleating agents, such as sodium pimelate, calcium pimelate and/or quinacridinone quinone.

As stabilizers for the inventive method, preferably mixtures of 0.01 to 0.6% by weight of phenolic antioxidants, 0.01 to 0.6% by weight of 3-arylbenzofuranones, 0.01 to 0.6% by weight of processing stabilizers based on phosphites, 0.01 to 0.6% by weight of high-temperature stabilizers based on disulfides and thioethers and/or 0.01 to 8% by weight of sterically hindered amines (HALS) are used.

Suitable phenolic antioxidants are 2-t-butyl-4,6-dimethylphenol, 2,6-di-t-butyl-4-methylphenol, 2,6-di-t-butyl-4-isoamylphenol, 2,6-di-t-butyl-4-ethylphenol, 2-t-butyl-4,6-diisopropylphenol, 2,6-dicyclopentyl-4-methylphenol, 2,6-di-t-butyl-4-methoxymethylphenol, 2-t-butyl-4,6-dioctadecylphenol, 2,5-di-t-butylhydroquinone, 2,6-di-t-butyl-4,4-hexadecyloxyphenol, 2,2'-methylene-bis-(6-t-butyl-4-methylphenol), 4,4'-thio-bis-(6-t-butyl-2-methylphenol), octadecyl 3(3,5-di-t-butyl-4-hydroxyphenyl) propionate, 1,3,5-trimethyl-2,4,6-tris(3', 5'-di-t-butyl-4-hydroxybenzyl)benzene and/or pentaerythritol-tetrakis(3-(3,5-di-t-butyl4-hydroxyphenyl)) propionate.

As benzofuranone derivative, 5,7-di-t-butyl-3-(3,4-di-methylphenyl)-3H-2-benzofuranone, in particular, is suitable.

As HALS compounds, bis-2,2,6,6-tetramethyl-4-piperidyl sebacate and/or poly-((1,1,3,3,-tetramethylbutyl)-imino)-1,3,5-triazine-2,4,diyl)(2,2,6,6-tetra-methylpiperidyl)-amino)-hexamethylene4-(2,2,6,6-tetramethyl)piperidyl)-imino) are particularly suitable.

As silanol condensation catalyst, for the inventive method, preferably dibutyl tin dilaurate is used.

As processing aids, calcium stearate, magnesium stearate and/or waxes can be used.

Pursuant to the invention, the fine-celled polyolefin foams of high dimensional stability at elevated temperatures and high stiffness preferably are used in the packaging sector, in the vehicle industry and for components of electric and electronic equipment.

Examples of uses in the packaging sector are industrial packaging for electronic equipment and household equipment, as well as thermoformed food packaging.

Examples of use in the vehicle industry include exterior parts of motor vehicles, such as the core material for bumper bars and the edge protection for hollow doors as well as interior parts for motor vehicles, such as the interior lining of the engine compartment, head rests, sunshades, arm rests, knee cushions, door linings, roof linings and the housing for heater fittings.

The invention is further explained by the following examples.

EXAMPLE 1

Production of a particle extrusion foam uses a mixture of 75% by weight of a powdery random polypropylene copolymer (with a melt index of 0.65 g/10 min. at 230° C./2.16 kg, an ethylene content of 4.5% by weight and an average particle size of 0.09 mm) and 25% by weight of an HDPE homopolymer, having a density of 0.954 g/cc, a melt index of 0.25 g/10 min. at 190° C./5 kg and a particle size of 0.15 mm.

In the first reactive process step, the powdery mixture is added to a continuous follow-through mixer and homogenized at 35° C. with 0.14% by weight of bis(t-butylperoxy)-2,5-dimethylhexane and with 0.1% by weight of calcium stearate (in each case based on the polyolefin mixture). Subsequently, the polyolefin mixture, charged with the thermally decomposing free radical-forming agent and auxiliary material, is transferred to a continuous screw mixer and, for 5 minutes at 40° C., charged absorptively with 0.85% by weight of butadiene by the inert gas mixture containing butadiene and, in a second continuous screw mixer, partially reacted at 85° C. for 5.5 minutes.

An analytical sample of the first reactive process step, taken before processing by the twin screw extruder, revealed an unreacted butadiene content of 0.35% by weight and an unreacted peroxide content of 0.05% by weight.

In the second reactive process step, the reaction mixture, after it is added to the twin screw extruder, is melted with 1.3% by weight of a mixture of sodium bicarbonate and calcium pimelate as nucleating agents, 0.1% by weight of tetrakis(methylene(3,5-di-t-butylhydroxyhydrocinnamate)) methane and 0.1% by weight of tris(2,4-di-t-butyl-phenyl) phosphite at a mass temperature of 225° C., 7.5% by weight of a methylbutane mixture being injected into the plastic melt at 185° C. as a blowing agent.

The melt is discharged at a nozzle temperature of 140° C. and the resulting foamed extrudate is immediately cut into segments. The foam particles are stored for 20 hours at room temperature in order to achieve pressure equalization between the interior of the cells and the surroundings.

The particle foam, based on the modified mixture of polypropylene and polyethylene, is processed by the "steam chest molding" method by blowing superheated steam through the mold, filled with the particle foam, into pipe insulation shells for use at temperatures up to 100° C., the molded part having a density of 90 kg/m$^3$. Stamped-out test specimens have a tensile strength of 580 kPa and a water absorption of 1.10% by weight (23° C., 160 hours).

EXAMPLE 2

Production of an extrusion foam uses a mixture of 90% by weight of a polypropylene homopolymer, with a melt index of 0.2 g/10 min. at 230° C./2.16 kg, and 10% by weight of an LDPE copolymer, with a density of 0.920 g/cc and a melt index of 0.15 g/10 min. at 190° C./2.16 kg and containing 0.32% by weight of bound 1-butene and having an average particle size of 3.5 mm.

The mixture of polypropylene and polyolefin is homogenized in an internal mixer with 1.15% by weight of vinyltrimethoxysilane, 0.05% by weight of hydrotalcit, 0.05% by weight of calcium stearate, 0.8% by weight of calcium pimelate, 0.1% by weight of tetrakis(methylene(3, 5-di-t-butylhydroxyhydro-cinnamate)methane, 0.1% by weight of tris-(2,4-di-t-butylphenyl) phosphite and 0.45% by weight of di-t-butyl peroxide, in each case based on the polyolefin mixture and partially reacted in a first reactive process step in a twin screw extruder at a temperature profile of 90°/110°/125°/165°/175°/175° C. in a solid phase/melt transition phase at a residence time of 2.5 minutes.

An analytical sample of the first reactive process step, taken before processing by the second twin screw extruder, revealed an unreacted vinyltrimethoxysilane content of 0.25% by weight and an unreacted peroxide content of 0.08% by weight.

In the second reactive process step, the reaction mixture is added to a second twin screw extruder and a coupling of the unreacted reactants takes place by increasing the melt temperature to 235° C. After the addition of 5.9% by weight, based on the polyolefin mixture, of a methylbutane mixture as a blowing agent and homogenization of the mixture, the melt is discharged at 165° C. through an annular die at 165° C. and removed, while being subjected to internal air cooling, as a blown film tube and wound up.

The resulting tubular film, with a density of 190 kg/m$^3$ and a modulus of bending of 12.5×10$^7$ N/mm$^2$, is used to produce thermoformed food packaging.

We claim:

1. A fine-celled polyolefin foam of high dimensional stability at elevated temperatures and high stiffness having a density ranging from 10 to 600 kg/m$^3$, comprising polypropylenes and polyethylenes, the polyolefin foam being produced using mixtures of 10 to 90% by weight of polypropylenes and 90 to 10% by weight of polyethylenes in two reactive process steps and one foaming step, a) the first reactive process step including a preliminary reaction, the preliminary reaction including, either partially reacting a powdery polypropylene-polyethylene mixture in the solid phase at reaction temperatures of 55° to 105° C. in continuous screw mixers with 0.05 to 2% by weight of bifunctional, ethylenically unsaturated monomers and/or 0.1 to 5% by weight of hydrolyzable, ethylenically unsaturated silane compounds in the presence of 0.01 to 0.85% by weight of thermally decomposing free-radical forming agents which are acyl peroxides, alkyl peroxides, hydroperoxides and/or peresters, which have a half-life of 0.2 to 5 minutes at the reaction temperature, each based on the weight of the polypropylene-polyethylene mixture or partially reacting the polypropylene-polyethylene mixture in a solid phase/melt transition phase at reaction temperatures of 105° to 190° C. in an extruder with 0.05 to 2% by weight of bifunctional ethylenically unsaturated monomers and/or 0.1 to 5% by weight of hydrolyzable ethylenically unsaturated silane compounds in the presence of 0.01 to 0.85% by weight of thermally decomposing free-radical forming agents which are acyl peroxides, alkyl peroxides, hydroperoxides, peroxycarbonates, peresters, ketone peroxides, peroxyketals and/or azo compounds, which have a half-life of 0.2 to 2 minutes at the reaction temperature, each based on the weight of the polypropylene-polyethylene mixture and, after the partial reaction, 5 to 35% by weight of the ethylenically unsaturated monomers and 10 to 40% by weight of the thermally decomposing free radical-forming agents used being contained unchanged in the reaction mixture, b) the second reactive process step including a coupling of unreacted reactants, contained in the reaction mixture, the step of coupling occurring in an extruder by adjusting the temperature of the reaction mixture to a value ranging from 195° to 270° C. and adding 0.3 to 8% by weight of blowing agents based on the weight of the polypropylene-polyethylene mixture and c) the reaction mixture being discharged with foaming from the extruder and being removed from the extruder as a foamed semi-finished product in the form of sheets, pipes or profiles or discharged as foamed extrudate and immediately cut into particle foam segments.

2. The fine-celled polyolefin foam of claim 1, wherein the polypropylenes include propylene homopolymers and/or copolymers of propylene and α-olefins with 2 to 18 carbons atoms, and mixtures of these polypropylene, the polypropylenes are powders, granulates or grits with a particle size ranging from 0.001 to 7 mm, the second reactive step adds 0.01 to 0.35% by weight of peroxides, based on the weight of the polypropylene-polyethylene mixture, and before or during the first and/or second reactive process step 0.01 to 1% by weight of a nucleating agent, 0.01 to 2.5% by weight of stabilizers, 0.1 to 1% by weight of antistatic agents, 0.2 to 3% by weight of pigments, 5 to 40% by weight of fillers and/or reinforcing materials, 2 to 20% by weight of flame retardants, 0.1 to 5% by weight of silanol condensation catalysts and/or 0.1 to 5% by weight of processing aids, each based on the weight of the polypropylene-polyethylene mixture, are added.

3. The fine-celled polyolefin foam of claim 1 or 2, wherein the polyethylenes include HDPE, LDPE, LLDPE, ULDPE, copolymers of ethylene with α-olefins with 3 to 18 carbon atoms or copolymers of ethylene, unsaturated esters and/or unsaturated carboxylic acids, and mixtures of these polyethylenes, and the polyethylenes are powders, granulates or grits with a particle size ranging from 0.001 to 7 mm.

4. The fine-celled polyolefin foam of claim 1 or 2, wherein the bifunctional, ethylenically unsaturated monomers are $C_4$ to $C_{10}$ dienes, $C_5$ to $C_9$ allyl compounds and/or $C_7$ to $C_{10}$ divinyl compounds.

5. The fine-celled polyolefin foam of claim 1 or 2, wherein the hydrolyzable, ethylenically unsaturated silane compounds are vinylalkoxysilanes and/or methacryloxyalkylsilanes.

6. The fine-celled polyolefin foam of claim 1 or 2, wherein the gas-emitting blowing agents are highly volatile hydrocarbons, highly volatile halogenated hydrocarbons and/or gases.

7. A packaging, for packaging foods, external and internal parts of motor vehicles, and for components of electric and electronic equipment, comprising the fine-celled polyolefin foam of high dimensional stability at elevated temperatures and high stiffness of claim 1 or 2.

8. The fine-celled polyolefin foam of claim 1, wherein the foam is produced using mixtures of 60 to 80% by weight of polypropylenes and 40 to 20% by weight of polyethylenes in two reactive process steps and one foaming step.

9. The fine-celled polyolefin foam of claim 2 or 3, wherein the particle size ranges from 0.05 to 4 mm.

10. The fine-celled polyolefin foam of claim 4, wherein the bifunctional, ethylenically unsaturated monomers are butadiene, isoprene, dimethylbutadiene, allyl acrylate and/or divinyl benzene.

11. The fine-celled polyolefin foam of claim 5, wherein the hydrolyzable, ethylenically unsaturated silane compounds are vinyltrimethoxysilane, vinyltriethoxy-silane and/or methacrylisopropytrimethoxysilane.

* * * * *